US010630610B1

(12) United States Patent
Wang et al.

(10) Patent No.: US 10,630,610 B1
(45) Date of Patent: Apr. 21, 2020

(54) MECHANISMS FOR PREVENTING IPID OVERFLOW IN COMPUTER NETWORKS

(71) Applicant: VMware, Inc., Palo Alto, CA (US)

(72) Inventors: Yong Wang, San Jose, CA (US); Xinhua Hong, Campbell, CA (US); Jia Yu, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/232,887

(22) Filed: Dec. 26, 2018

(51) Int. Cl.
| H04L 12/28 | (2006.01) |
| H04L 12/939 | (2013.01) |
| H04L 12/935 | (2013.01) |
| H04L 12/861 | (2013.01) |
| H04L 12/801 | (2013.01) |
| H04L 29/06 | (2006.01) |
| H04L 12/66 | (2006.01) |

(52) U.S. Cl.
CPC .......... H04L 49/552 (2013.01); H04L 12/66 (2013.01); H04L 47/34 (2013.01); H04L 49/3072 (2013.01); H04L 49/9057 (2013.01); H04L 49/9084 (2013.01); H04L 69/166 (2013.01); H04L 69/22 (2013.01)

(58) Field of Classification Search
None
See application file for complete search history.

(56) References Cited

U.S. PATENT DOCUMENTS

| 8,532,107 | B1 * | 9/2013 | Ghosh | H04L 45/00 370/392 |
| 2009/0287843 | A1 * | 11/2009 | Morimura | H04L 49/90 709/236 |
| 2012/0257631 | A1 * | 10/2012 | Nguyen | H04L 43/16 370/400 |
| 2013/0077968 | A1 * | 3/2013 | Yang | H04B 10/40 398/45 |
| 2014/0198809 | A1 * | 7/2014 | Shi | H04L 69/22 370/477 |

OTHER PUBLICATIONS

J. Heffner, et al. "Network Working Group—Ipv4 Reassembly Errors at High Data Rates", dated Jul. 2007 (10 pages).

* cited by examiner

*Primary Examiner* — Clemence S Han
(74) *Attorney, Agent, or Firm* — Hickman Palermo Becker Bingham LLP; Malgorzata A. Kulczycka (57) ABSTRACT

In an embodiment, a computer-implemented method for preventing an Internet Protocol identifier ("IPID") overflow in computer networks is disclosed. In an embodiment, the method comprises: receiving, by an edge service gateway, a first packet that requires fragmentating, and determining whether the edge service gateway is configured to prevent IPID overflow. In response to determining that the edge service gateway is configured to prevent IPID overflow, a plurality of packet fragments for the first packet is created based on, at least in part, contents of the first packet. A packet fragment, of the plurality of packet fragments, comprises an IP header, an additional header, and a portion of the first packet, wherein an additional key field in the additional header and an IPID field in the IP header of the packet fragment cumulatively store a packet sequence number for the first packet.

20 Claims, 5 Drawing Sheets

MECHANISMS FOR PREVENTING IPID OVERFLOW IN COMPUTER NETWORKS

BACKGROUND

Layer 2 virtual private networks may be implemented in many ways. Some implementations include establishing Generic Routing Encapsulation ("GRE") tunnels over IPsec tunnels, using the two layers of packet encapsulation, and prepending corresponding GRE headers and ESP headers to the original Ethernet packets. Since a total length of each of the resulting packets cannot exceed a certain length and since the GRE-ESP headers are usually long, some networks are unable to handle the packets with the prepended headers. One of the solutions to that problem is to divide the packets into small fragments and prepend the headers to the individual fragments. The process of dividing a packet into packet fragments is referred to as a packet fragmentation.

IP fragmentation is a process of dividing an original IP packet into multiple packet fragments, where each fragment has a size that is smaller than a size of the original IP packet. The IP fragmentation may be performed by various devices, and in one implementation it is performed by an edge service gateway. An edge service gateway may be a distributed logical router or a service gateway that is configured to provide network edge security and gateway services to machines and users. Examples of gateways are described later.

To perform an IP fragmentation on an IP packet, an edge service gateway determines a packet identifier for the packet. The packet identifier is usually determined during a GRE encapsulation which includes prepending the IP and GRE headers to the original packet. A packet identifier, also referred to herein as an Internet Protocol Identifier ("IPID"), is a packet sequence number that the gateway assigns to a received packet. For example, upon receiving a new packet, the gateway increments the packet identifier that was used for a previously received packet by one, and assigns the incremented identifier to the new packet. If the incremented identifier exceeds a certain limit, then the identifier is reset to zero. To continue with the IP fragmentation, the gateway divides the received packet into multiple packet fragments and stores the packet identifier in a header of each packet fragment.

However, since a typical header field for encoding a packet identifier includes only 16 bits, the identifiers can range from zero to $(2^{16}-1)$. Once an identifier reaches $2^{16}$, the identifier is reset to zero. Resetting an identifier, also referred to as an identifier wrapping, may occur in networks quite often. The example below illustrates a situation when the wrapping occurs 10 times per second: suppose that devices in a network are configured with a maximum transmission unit ("MTU") of 1500, wherein a MTU corresponds to a maximum size of packets that the devices may handle. Suppose also that a GRE+ESP header is 100-byte-long, and a 10G uplink is configured to handle 800 k of packets having 1500 MTU per second. Therefore, a 16-bit-long identifier will be reset about $800\,k/2^{16}$ times per second, which is about 10 times per second.

Wrapping a packet identifier may have negative consequences, especially on a fragment-receiving side. When an edge service gateway receives packet fragments, it stores them in buffers and uses a packet identifier to reassemble the original packets. The fragments are placed into buffers based on the protocol numbers, the packet identifiers, and the source/destination address pairs included in the headers of the fragments. However, if a sender edge gateway included a wrapped packet identifier in the headers of some fragments of an original packet before the receiving gateway fully reassembled the original packet, then the fragments with the same packet identifier may belong to, or overlap, different original packets. This is referred to as an incorrect splicing, IPID overflow, or mis-associating the packet identifiers with the packets and the packet fragments.

Therefore, there is a need to solve the problem of the IPID overflow in computer networks.

SUMMARY

In an embodiment, mechanisms for preventing IPID overflow in computer networks are described. Examples of computer networks to which the mechanisms are particularly applicable include Layer 2 virtual private networks ("VPNs"). Examples of entities in which the mechanisms may be implemented include edge service gateways. However, in general, the mechanisms may be also implemented in other types of networks and devices.

In an embodiment, the mechanisms for preventing IPID overflow are implemented in edge service gateways as the gateways divide received original packets into fragments and as the gateways reassemble received fragments into original packets. For example, an edge service gateway may implement the mechanisms as a packet-receiving-gateway as the gateway divides original packets into fragments, and as a fragment-receiving-gateway as the gateway reassembles other fragments into other original packets.

On a packet-receiving-side, upon receiving a packet, an edge service gateway implementing the mechanisms for preventing IPID overflow determines an IPID for the packet. The IPID is encoded on 48 bits, not just on 16 bits as in conventional approaches. Therefore, the present approach extends the encoding space for IPIDs from 16 bits to 48 bits, allowing the IPIDs to range from zero to $(2^{48}-1)$, not just from zero to $(2^{16}-1)$ as in conventional approaches. Hence, an IPID is reset only after the IPID reaches $2^{48}$, which is a significant improvement over the conventional approaches in which the IPID is reset after it reaches $2^{16}$. Resetting the IPID less frequently decreases the likelihood of mis-assigning the IPIDs to packets.

The edge service gateway divides the packet into fragments and encapsulates each fragment with an IP header and a GRE header. In an embodiment, a GRE key field of the GRE header is used to store the higher 32 bits of the IPID, and an IPID field of the IP header is used to store the lower 16 bits of the IPID. Through the disclosure, the approach is described in reference to GRE; however, other encapsulating protocols that can encapsulate L2 packets may be used.

In other embodiments, a header of any other encapsulation protocol is used to store the higher 32 bits of the IPID. For example, the approach may be implemented using VXLAN protocol, and a certain field of a VXLAN header may be used to store the higher 32 bits of the IPID.

On a fragment-receiving side, upon receiving a fragment, an edge service gateway accesses an IP header of the fragment and checks whether the IP header includes a GRE protocol identifier. If it does, then the gateway checks whether the gateway implements the mechanisms for preventing IPID overflow. This may be performed by, for example, checking whether a certain flag is set in the gateway's configuration file. If it is, then the gateway accesses a GRE header included in the fragment and extracts a GRE key from the GRE header.

Furthermore, the gateway extracts an IPID value from an IPID field included in the IP header of the fragment. The extracted GRE key and the extracted IPID value are concatenated to derive a 48-bit-long IPID for the packet. The 48-bit-long IPID is used, along with the source/destination address pairs included in the fragment to perform the packet lookup and to continue reassembling of the entire original packet.

Because the IPIDs are encoded using 48 bits, not just 16 bits, the IPIDs are reset less frequently than in conventional approaches, and thus the likelihood of the IPID overflow and mis-assigning the IPIDs to packets is reduced.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
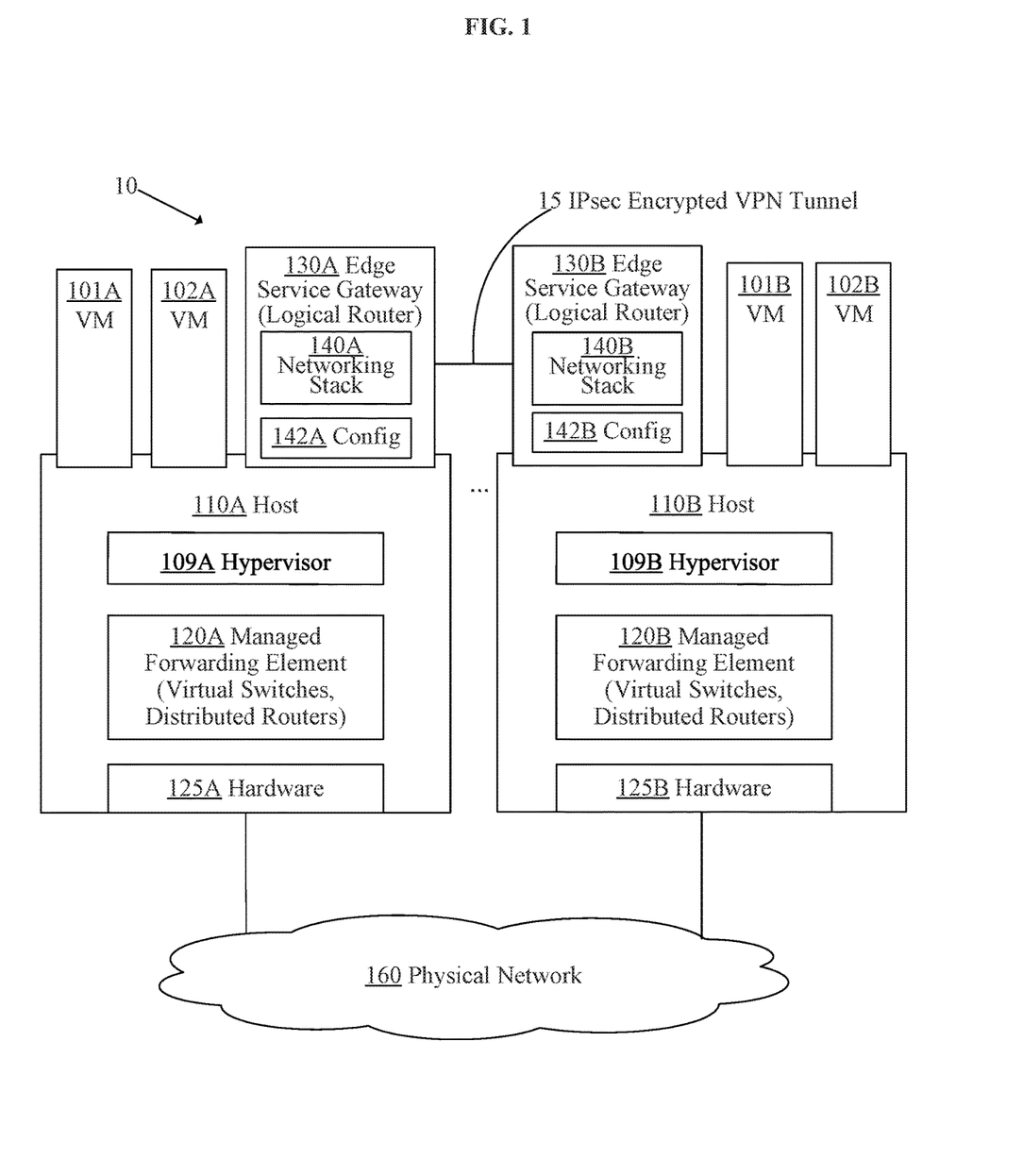
FIG. 1 is a block diagram depicting an example physical implementation view of an example logical network environment for implementing mechanisms for preventing IPID overflow in computer networks.

FIG. 1 is a block diagram depicting an example physical implementation view of an example logical network environment for implementing mechanisms for preventing IPID overflow in computer networks. In the depicted example, environment 10 includes a plurality of hosts 110A, 110B, a plurality of virtual machines ("VMs") 101A, 102A, 101B, 102B, an edge service gateway 130A, and edge service gateway 130B, and a physical network 160. Environment 10 and physical network 160 may include additional elements, such as routers, switches, and gateways (not shown).

Each host 110A/110B is a computer device configured to implement virtual machines, such as VMs 101A, 102A, 101B, 102B, edge service gateways, logical routers, logical switches, and the like. Each host 110A/110B is also referred to as a computing device, a host computer, a host device, a physical server, a server system, or a physical machine.

Virtual machines 101A, 102A, 101B, 102B are executed on hosts 110A-110B, respectively, and are examples of virtualized computing instances or workloads. A virtualized computing instance may include an addressable data compute node or an isolated user space instance, often referred to as name space containers. VMs 101A, 102A, 101B, 102B may implement edge nodes, edge node gateways, and the like.

In an embodiment, host 110A/110B is configured to support execution of a hypervisor 109A/109B and execution of a managed forwarding element 120A/120B. A hypervisor is a software layer or component that supports the execution of the VMs. The hypervisor may also be configured to implement virtual switches and forwarding tables that facilitate traffic between the machines. In certain embodiments, the virtual switches and other components may reside in a privileged virtual machine, sometimes referred to as a "Domain Zero" or a "root partition" (not depicted in FIG. 1). The hypervisor may also maintain a mapping between underlying hardware components and virtual resources allocated to the respective VMs. The hardware components may include computer processors, memory units, physical network interface cards, and storage devices.

Edge service gateways 130A and 130B provide network edge security and gateway services to machines and tenants. Edge service gateways 130A and 130B may be installed either as logical, distributed routers or as services gateways. Edge service gateways 130A and 130B may be configured to connect isolated sub networks to shared networks by providing common gateway services such as DHCP, VPN, NAT, dynamic routing, and load balancing services.

Edge service gateways 130A and 130B may be configured to implement VPN endpoints having mechanisms for preventing IPID overflow. In an embodiment, edge service gateway 130A comprises a networking stack 140A and maintains a configuration file 142A, while edge service gateway 130B comprises a networking stack 140B and maintains a configuration file 142B. Networking stack 140A/140B may be implemented in software configured to receive packets, assign IPIDs to the packets, fragment the packets, encode the IPIDs in headers of the fragments, transmit the fragments, receive other fragments, and use the other fragments to reassemble original packets. The implementation details are described in FIG. 3-5.

Hosts 106A and 106B may be configured with virtual network interfaces ("VNICs"), not depicted in FIG. 1. A VNIC is a software-based network interface that a VM may use to communicate with other network components. A VNIC is assigned a MAC address, and a VM may use a VNIC to communicate with other VMs, hypervisors, or other network end-points reachable from the physical network.

Host 110A may include a hardware component 125A, while host 110B may include a hardware component 125B. Hardware components 125A and 125B may each comprise a commodity hardware computing platform including one or more processors, one or more memory units, one or more physical network interface cards, and one or more storage devices (not shown).

2. Example Packet Fragmentation Process

Figure 2:
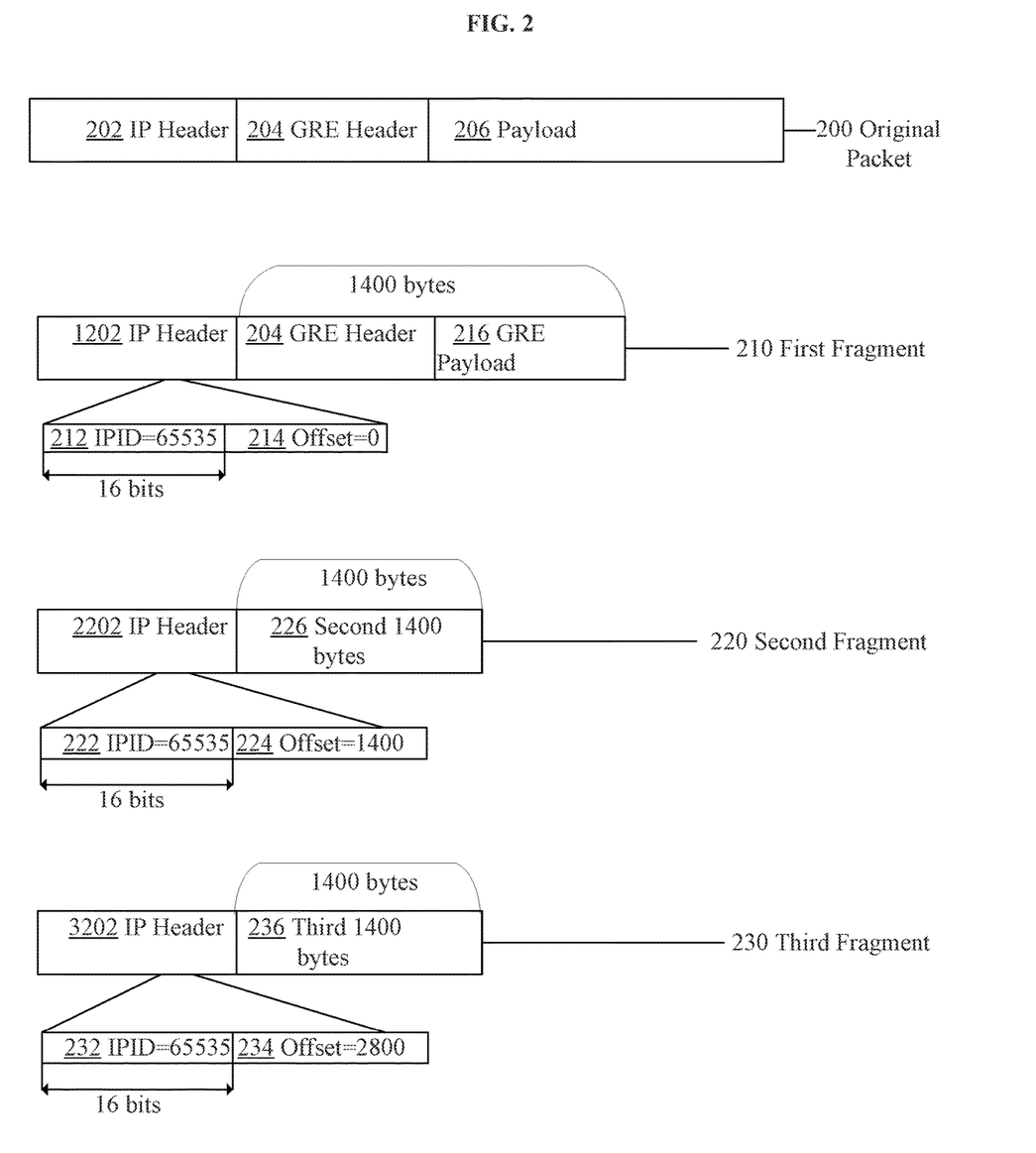
FIG. 2 is a block diagram depicting an example packet fragmentation process.

FIG. 2 is a block diagram depicting an example packet fragmentation process. The process is described using an example original packet 200 and illustrates the packet fragmentation performed without implementing the mechanisms for preventing IPID overflow.

Suppose that an edge service gateway received packet 200 that includes an IP header 202, a GRE header 204, and a payload 206. Suppose that, upon receiving packet 200, the gateway determined that an IPID for packet 200 is 65535, or any other positive number lesser than 65535. The IPID field in the standard IPv4 header is 16 bits long, thus having a maximum value of $(2^{16}-1)$, which is 65535.

It is further assumed that packet 200 needs to be divided into fragments because packet 200 is too long to be transmitted by the gateway as is. It is further assumed that the gateway divides packet 200 into three fragments, wherein a first fragment includes an IP header, a GRE header, and a GRE payload. Each of the remaining fragments includes an IP header and a payload.

In the example depicted in FIG. 2, packet 200 is divided into a first fragment 210, a second fragment 220, and a third fragment 230. First fragment 210 includes an IP header 1202, a GRE header 204, and a GRE payload 216. IP header 1202 includes an IPID field 212 that is 16-bit-long, and an offset field 214. IPID field 212 stores the IPID which for packet 200 is 65535. Offset 214 stores zero because this is the first fragment of packet 200.

Second fragment 220 includes an IP header 2202, and a payload 226. IP header 2202 includes an IPID field 222 that is 16-bit-long, and an offset field 224. IPID field 222 stores the IPID which is 65535. Offset 224 stores 1400 because this is the second fragment of packet 200, and the first 1400 bytes of packet 200 have been already stored in first fragment 210.

Third fragment 230 includes an IP header 3202, and a payload 236. IP header 3202 includes an IPID field 232 that is 16-bit-long, and an offset field 234. IPID field 232 stores the IPID which is 65535. Offset 234 stores 2800 because this is the third fragment of packet 200, and the first 2800 bytes of packet 200 have been already stored in fragments 210-220.

The example depicted in FIG. 2 illustrates that 16 bits is sufficient to encode the packet numbers from 0 to 65535. However, in a typical L2 VPN network, the IPIDs may quickly exceed 65535. However, if only 16 bits is used to encode the IPIDs, then an IPID of 65536 will be reset to zero, which may lead to IPID overflow and mis-assignment, or reusing, of the IPIDs to packets, which in turn, may lead to errors.

If a typical edge service gateway uses only 16 bits to encode IPIDs, then an IPID needs to be reset about 10 times per a second for typical 10G traffic. Once reset, a new IPID is assigned to a new IP packet, and thus the same IPID may be assigned to both an old packet and a new packet. Therefore, upon receiving a fragment with a reset IPID, a receiving edge service gateway may incorrectly queue the fragment as belonging to the old packet, not the new packet. While the reassembly code may detect the error via validating an offset or an IP checksum included in the fragment, the receiving gateway may be unable to do so as it may be unable to discern whether the fragment belongs to the old packet or the new packet.

Mis-associating packet identifiers with fragments is particularly concerning when it is self-propagating. This occurs when a first fragment of an original packet is lost in the network, and a fragment-receiving gateway receives the remaining fragments of the original packet but the first fragment. At some point, a packet-receiving gateway will wrap the packet identifier, and the fragment-receiving gateway may receive a first fragment that has a packet identifier of the original packet but that is intended for a new original packet. Nevertheless, the receiving gateway may mis-assign the received first fragment to the original packet but not to the new original packet. This mis-assigning may continue and propagate for some time. In fact, if the packet identifiers are encoded on 16 bits, this cycle can repeat itself every $2^{16}$ (i.e., 65536) packets.

3. Example Packet Fragmentation Mechanisms for Preventing IPID Overflow

Figure 3:
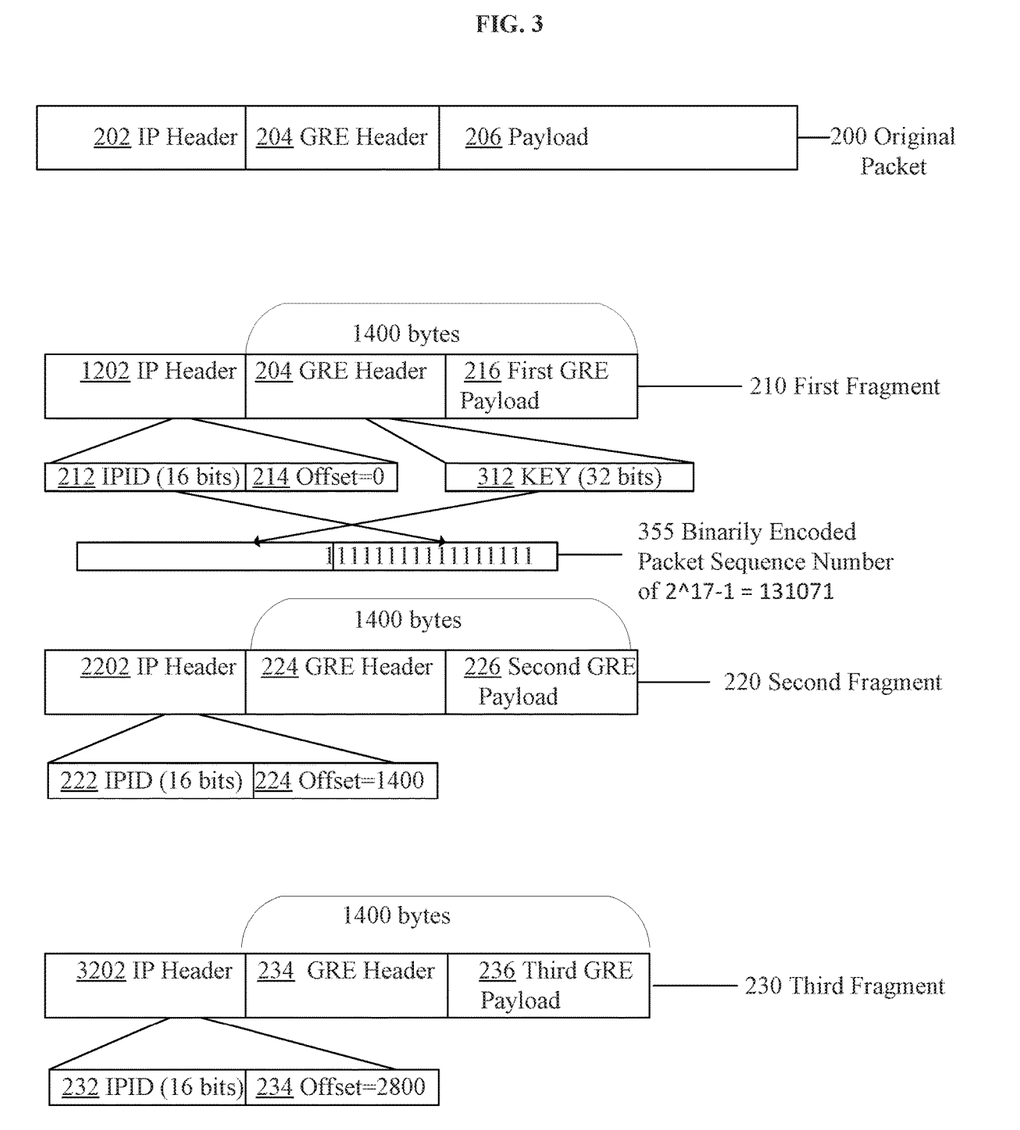
FIG. 3 is a block diagram depicting example mechanisms for preventing IPID overflow in computer networks.

FIG. 3 is a block diagram depicting example mechanisms for preventing IPID overflow in computer networks. The process is described using an example original packet 200 and illustrates the packet fragmentation that implements the mechanisms for preventing IPID overflow.

In an embodiment, the mechanisms include encoding an IPID on 48 bits, out of which 32 higher bits of the IPID are stored in a GRE key field of a GRE header of a packet fragment, and 16 lower bits of the IPID are stored in an IPID field of an IP header of the packet fragment. The 48 bits provide enough space to encode the packet numbers from 0 to 281474976710655, allowing encoding $2^{48}$ unique numbers.

Suppose that, upon receiving packet 200, an edge service gateway determined that an IPID for packet 200 is 65536. That IPID cannot be encoded using 16 bits without an identifier-wrapping because $(2^{16}-1)$ is 65535, not 65536. However, that IPID may be encoded using the present mechanisms because the present mechanisms provide 48 bits for encoding IPIDs.

In FIG. 2, it is assumed that packet 200 needs to be divided into fragments because packet 200 is too long to be transmitted by the gateway as is. It is further assumed that packet 200 is divided into three fragments, and that each fragment includes an IP header, a GRE header and a GRE payload. The GRE payloads are used to store portions of packet 200.

In an embodiment, it is assumed that a GRE key field in a GRE header includes 32 bits. The 32 bits of the GRE key field may be used to encode the higher 32 bits of an IPID, while 16 bits of an IPID field of an IP header may be used to encode the lower 16 bits of the IPID. By concatenating the 32 bits of the GRE key field of the GRE header with the 16 bits of the IPID field of the IP header, the encoding space for encoding IPIDs is expanded from the conventional 16 bits to 48 bits. Therefore, by concatenating the 32 bits of the GRE key field with the 16 bits of the IPID field, the IPIDs may range from 0 to $(2^{48}-1)$, which is a significantly larger range than the conventional range from 0 to $(2^{16}-1)$.

In the example depicted in FIG. 3, packet 200 is divided into a first fragment 210, a second fragment 220, and a third fragment 230. First fragment 210 includes an IP header 1202, a GRE header 204, and a GRE payload 216. IP header 1202 includes an IPID field 212 that is 16-bit-long, and an offset field 214. IPID field 212 stores the lower 16 bits of the IPID for packet 200. GRE header 204 includes a GRE key field 312, which is 32-bit-long, and is used to store the higher 32 bits of the IPID for packet 200. Offset 214 stores zero because this is the first fragment of packet 200.

Second fragment 220 includes an IP header 2202, a GRE header 224, and a GRE payload 226. IP header 2202 includes an IPID field 222 that is 16-bit-long, and an offset field 224. IPID field 222 stores the lower 16 bits of the IPID for packet 200. GRE header 224 includes a GRE key field 312 (not shown in FIG. 3), which is 32-bit-long, and is used to store the higher 32 bits of the IPID for packet 200. Offset 224 stores 1400 because this is the second fragment of packet 200, and the first 1400 bytes of packet 200 have been already stored in first fragment 210.

Third fragment 230 includes an IP header 3202, a GRE header 234, and a GRE payload 236. IP header 3202 includes an IPID field 232 that is 16-bit-long, and an offset field 234. IPID field 232 stores the lower 16 bits of the IPID for packet 200. GRE header 234 includes a GRE key field 312 (not shown in FIG. 3), which is 32-bit-long, and is used to store the highest 32 bits of the IPID for packet 200. Offset 234 stores 2800 because this is the third fragment of packet 200, and the first 2800 bytes of packet 200 have been already stored in fragments 210-220.

4. Example Flow Chart for Preventing IPID Overflow

Figure 4:
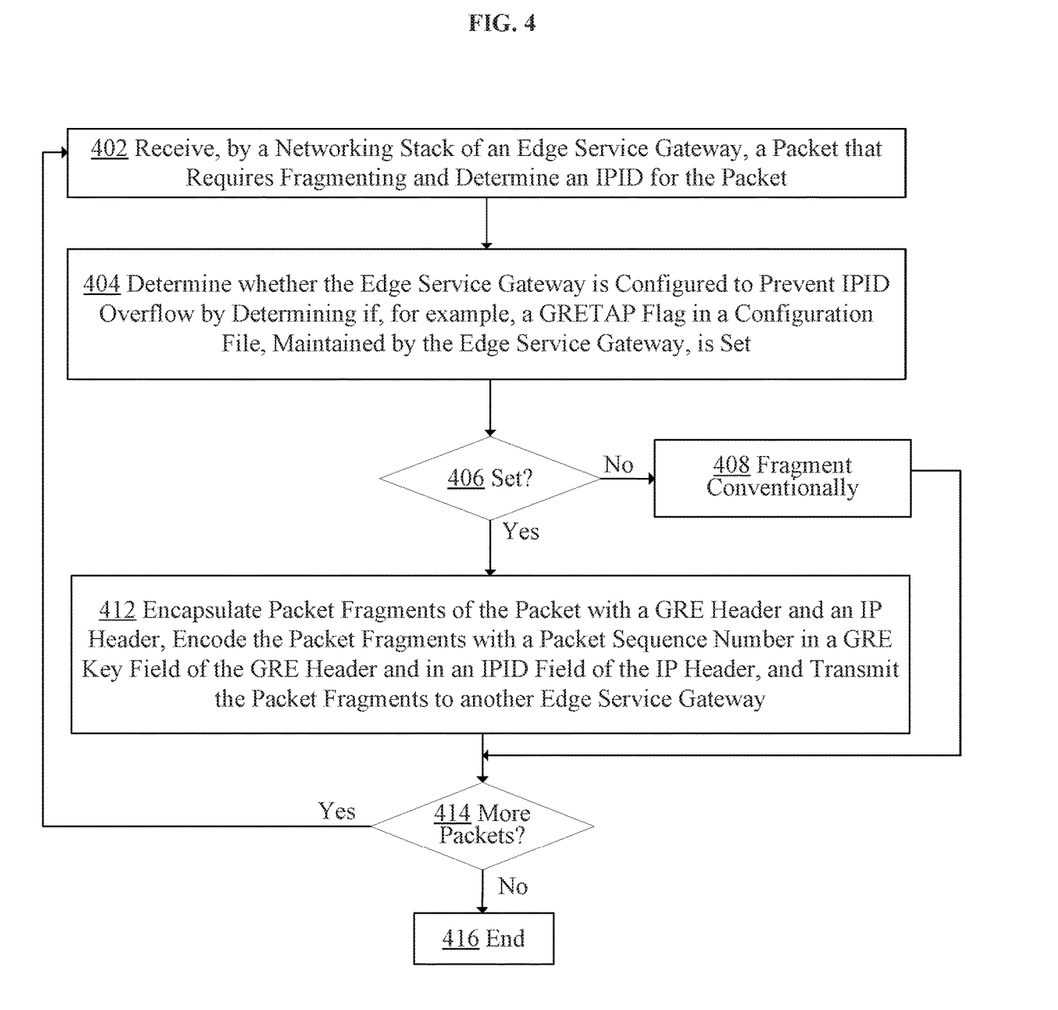
FIG. 4 is an example flow chart for implementing packet fragmentation mechanisms for preventing IPID overflow in computer networks.

FIG. 4 is an example flow chart for implementing packet fragmentation mechanisms for preventing IPID overflow in computer networks. The steps described in FIG. 4 may be performed by a software component implemented in an edge service gateway and configured to perform packet fragmentation to prevent IPID overflow in L2 VPN networks. The software component may be a networking stack application, including any of networking stack applications 140A-140B implemented in edge service gateways 130A-130B, respectively, shown in FIG. 1. To provide a clear description of FIG. 4, it is assumed that the steps are performed by a packet-receiving edge service gateway.

In step 402, an edge service gateway receives a packet that requires fragmentating. A packet may be identified as requiring fragmentating if the length of the packet exceeds a maximum packet length that the gateway can handle. For example, if the gateway can handle packets that are 1500 bytes long, then the packets that are longer than 1500 bytes (including the packet headers) need to be divided into fragments. In step 402, it is assumed that the gateway has already determined that the received packet requires fragmentating.

In step 402, the gateway also determines an IPID for the packet. The IPID for the packet may be determined by incrementing the previously used IPID, and if the newly determined IPID exceeds ($2^{48}-1$), the newly determined IPID is reset to zero.

In step 404, the gateway determines whether the gateway is configured to prevent IPID overflow. This may be determined using many approaches. For example, in step 404, the gateway may determine whether a particular flag in a configuration file maintained by the gateway is set. An example of such a flag is a GRETAP flag that may be set or unset in the configuration file maintained by the gateway. However, in other implementation, other flags or other mechanisms may be used.

If, in step 406, the gateway determines that the particular flag in the configuration file is set, then the gateway determines that the gateway is configured to prevent IPID overflow and proceeds to step 412.

However, if, in step 406, the gateway determines that the particular flag in the configuration file is not set, then the gateway determines that the gateway is not configured to prevent IPID overflow, and proceeds to step 408, in which the gateway performs the packet fragmentation without the mechanisms for preventing IPID overflow. An example of such a packet fragmentation is described in FIG. 2.

In step 412, which the gateway reaches if the gateway determines that the gateway is configured to prevent the IPID overflow, the gateway divides the packet into fragments. As shown in the example described in FIG. 3, a packet may be divided into multiple fragments, and each of the fragments may include an IP header, a GRE header, and a GRE payload. The IP header may include an IPID field that is 16-bit-long, and an offset field. The gateway stores the lower 16 bits of the IPID determined for the packet in the IPID field. The GRE header may include a GRE key field, which is 32-bit-long, and is used to store the higher 32 bits of the IPID for the packet. Thus, the GRE key field in the GRE header and the IPID field in the IP header of the packet fragment cumulatively store the entire 48-bit-long IPID for the packet. The resulting fragments are transmitted to their destination.

In step 414, the gateway determines whether a new packet is received. If the gateway determines that a new packet has been received, then the gateway proceeds to step 402; otherwise, the gateway proceeds to step 416 and ends executing.

5. Example Packet Reassembling Mechanisms for Preventing IPID Overflow

Figure 5:
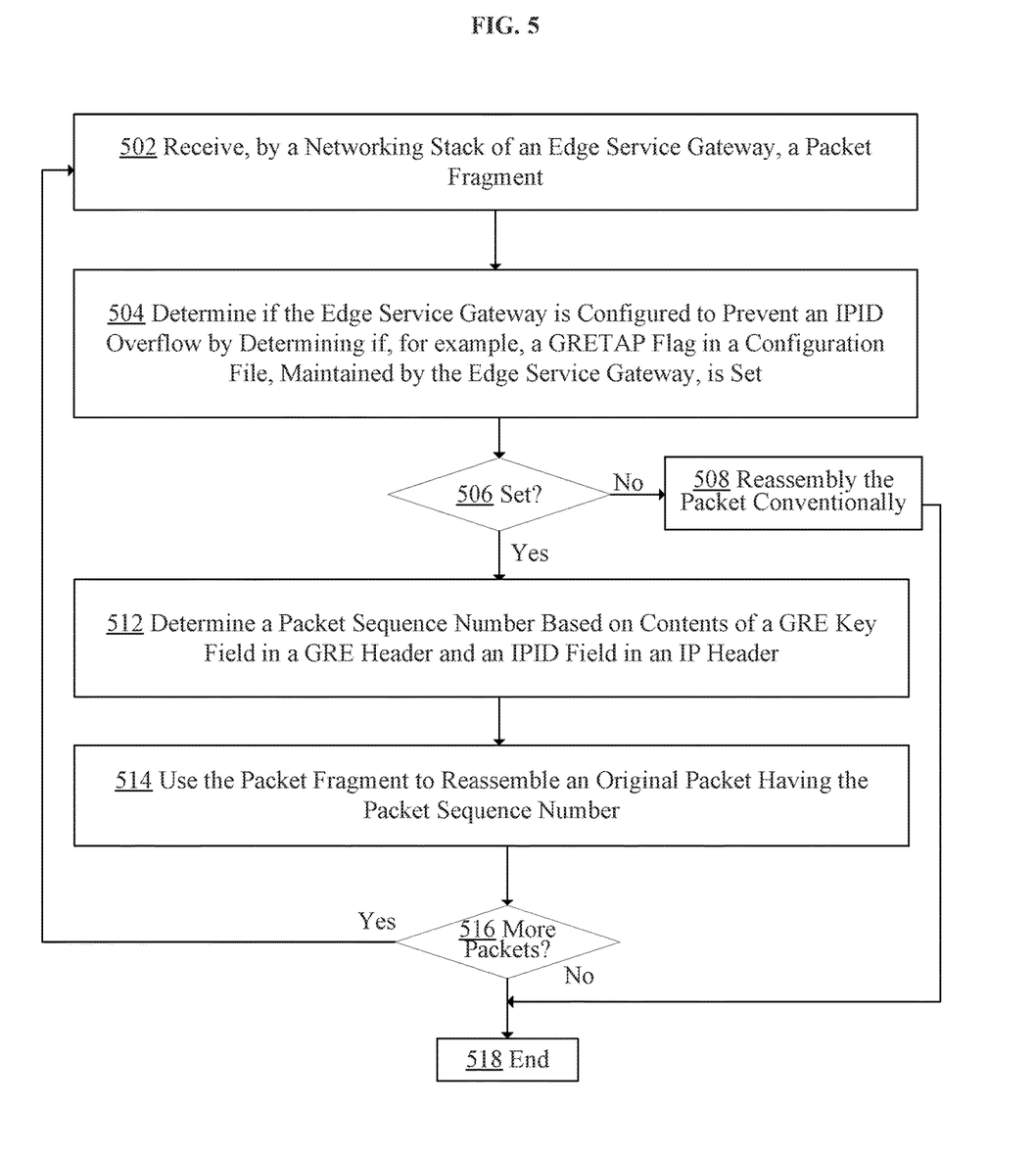
FIG. 5 is an example flow chart for implementing packet reassembling mechanisms for preventing IPID overflow in computer networks.

FIG. 5 is an example flow chart for implementing packet reassembling mechanisms for preventing IPID overflow in computer networks. The steps described in FIG. 5 may be performed by a software component implemented in an edge service gateway and configured to perform packet reassembling to prevent IPID overflow in L2 VPN networks. In an embodiment, the software component may be a networking stack application as any of networking stack applications 140A-140B implemented in edge service gateways 130A-130B, respectively, shown in FIG. 1. To provide a clear description of FIG. 5, it is assumed that the steps are performed by a fragment-receiving edge service gateway.

In step 502, an edge service gateway receives a fragment of an original packet. The gateway may determine whether the received fragment is a first fragment of the original packet, and if it is, then the gateway may create a packet buffer for the original packet and start reassembling the original packet. If the received fragment is not a first fragment of the original packet, then the gateway will await receiving the first fragment or has already received the first fragment and created a packet buffer for the original packet. Then, the gateway will use the received fragment to continue reassembling the original packet.

In step 504, the edge service gateway determines whether the gateway is configured to prevent IPID overflow. The gateway may determine that by, for example, determining whether a particular flag, such as a GRETAP flag, is set in a configuration file maintained by the gateway. In other implementation, other flags or other mechanisms may be used.

If, in step 506, the gateway determines that the particular flag in the configuration file is set, then the gateway determines that the gateway is configured to prevent IPID overflow, and thus proceeds to step 512.

However, if in step 506, the gateway determines that the particular flag in the configuration file is not set, then the gateway determines that the gateway is not configured to prevent IPID overflow, and thus proceeds to step 508, in which the gateway reassembles the packet without using the mechanisms for preventing IPID overflow.

In step 512, which the gateway reaches if the gateway determines that the gateway is configured to prevent IPID overflow, the gateway determines an IPID for the packet. This includes accessing a GRE key field in a GRE header of the fragment and extracting 32 bits of information from the GRE key field. This also includes accessing an IPID field in an IP header of the fragment and extracting 16 bits of information from the IPID field. Then, the gateway concatenates the 32 bits of information extracted from the GRE key field with the 16 bits of information extracted from the IPID field to form a 48-bit-long IPID for the packet.

In step 514, based on the 48-bit-long IPID of the packet and source/destination address pairs included in the IP header of the fragment, the gateway identifies a packet buffer that has been allocated for the original packet, and adds the content of the packet fragment to the identified packet buffer to continue reassembling the original packet. If all fragments of the original packet are timely received, then the gateway successfully reassembles the fragments into the original packet. However, if some fragments of the packet are not received by the expiration of a time-out period, then reassembling of the packet may be incomplete and the gateway may request that the fragments be retransmitted.

If the gateway determines that reassembling of the original packet is completed, then the gateway transmits the reassembled original packet toward its destination. Otherwise, the gateway will continue reassembling the relevant packet fragments, and meanwhile, proceed to step 516.

In step 516, the gateway determines whether a new packet fragment is received. If the gateway determines that a new packet fragment has been received, then the gateway proceeds to step 502; otherwise, the gateway proceeds to step 518 and ends executing.

6. Improvements Provided by Certain Embodiments

In an embodiment, an approach presented herein provides mechanisms for preventing IPID overflow in computer networks. The mechanisms include extending the encoding space for encoding packet IPIDs from 16 bits to 48 bits, and thus extending the IPIDs range from zero to $2^{48}-1$, which is a much larger range than the range from zero to $2^{16}-1$ used in conventional approaches.

In an embodiment, the mechanisms allow resetting an IPID only after the IPID reaches $2^{48}$, which provides significant improvements over the conventional approaches in which the IPID is reset after it reaches $2^{16}$. Resetting the IPID less often decreases the likelihood of the IPID overflow and mis-assigning the IPIDs to packets. Having a larger IPID range allows preventing and avoiding the IPID collision and re-reassembling errors.

7. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

8. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for preventing Internet Protocol Identifier overflow in computer networks, the method comprising:
   receiving, by an edge service gateway, a first packet that requires fragmentating;
   determining whether the edge service gateway is configured to prevent Internet Protocol Identifier ("IPID") overflow;
   in response to determining that the edge service gateway is configured to prevent IPID overflow:
      creating a plurality of packet fragments based on, at least in part, the first packet;
      wherein a packet fragment, of the plurality of packet fragments, comprises an IP header, an additional header, and a portion of the first packet; and
      wherein an additional key field in the additional header and an IPID field in the IP header of the fragment packet store a packet sequence number for the first packet.

2. The computer-implemented method of claim 1, wherein determining whether the edge service gateway is configured to prevent IPID overflow comprises:
   determining whether a particular flag in a configuration file maintained by the edge service gateway is set;
   in response to determining that the particular flag in the configuration file is set, determining that the edge service gateway is configured to prevent IPID overflow; and
   in response to determining that the particular flag in the configuration file is not set, determining that the edge service gateway is not configured to prevent IPID overflow.

3. The computer-implemented method of claim 1, wherein, for a particular packet fragment, of the plurality of packet fragments, the additional key field in the additional header stores a first portion of the packet sequence number and the IPID field in the IP header stores a second portion of the packet sequence number; wherein the first portion includes thirty two higher bits of the packet sequence number; and wherein the second portion includes sixteen lower bits of the packet sequence number.

4. The computer-implemented method of claim 1, further comprising: in response to determining that the edge service gateway is not configured to prevent IPID overflow, creating a plurality of packet fragments based on, at least in part, the first packet; wherein a packet fragment, of the plurality of packet fragments, comprises an IP header, a additional header and a portion of the first packet; and wherein an IPID field in the IP header stores a packet sequence number for the first packet.

5. The computer-implemented method of claim 1, wherein, for a first packet fragment, of the plurality of packet fragments, a cumulative length of the IP header, the additional header and the portion of the first packet does not exceed a particular fragment length; and wherein an offset field in the IP header of the first packet fragment stores zero.

6. The computer-implemented method of claim 1, further comprising: receiving, by the edge service gateway, a packet fragment that requires reassembling;

determining whether the edge service gateway is configured to prevent IPID overflow;
in response to determining that the edge service gateway is configured to prevent IPID overflow:
determining a packet sequence number based on contents of an additional key field in a additional header of the packet fragment and contents of an IPID field in an IP header of the packet fragment; and
based on, at least in part, the packet sequence number and the packet fragment, reassembling an original packet that is associated with the packet sequence number.

7. The computer-implemented method of claim 6, further comprising: in response to determining that the edge service gateway is not configured to prevent IPID overflow:
determining a packet sequence number based on contents of an IPID field in a IP header of the packet fragment; and
based on, at least in part, the packet sequence number and the packet fragment, reassembling an original packet that is associated with the packet sequence number.

8. One or more non-transitory computer-readable storage media storing one or more computer instructions which, when executed by one or more processors, cause the one or more processors to perform:
receiving, by an edge service gateway, a first packet that requires fragmentating;
determining whether the edge service gateway is configured to prevent Internet Protocol Identifier ("IPID") overflow;
in response to determining that the edge service gateway is configured to prevent IPID overflow:
creating a plurality of packet fragments based on, at least in part, the first packet;
wherein a packet fragment, of the plurality of packet fragments, comprises an IP header, an additional header and a portion of the first packet; and
wherein an additional key field in the additional header and an IPID field in the IP header of the fragment packet store a packet sequence number for the first packet.

9. The one or more non-transitory computer-readable storage media of claim 8, wherein determining whether the edge service gateway is configured to prevent IPID overflow comprises:
determining whether a particular flag in a configuration file maintained by the edge service gateway is set;
in response to determining that the particular flag in the configuration file is set, determining that the edge service gateway is configured to prevent IPID overflow; and
in response to determining that the particular flag in the configuration file is not set, determining that the edge service gateway is not configured to prevent IPID overflow.

10. The one or more non-transitory computer-readable storage media of claim 8, wherein, for a particular packet fragment, of the plurality of packet fragments, the additional key field in the additional header stores a first portion of the packet sequence number and the IPID field in the IP header stores a second portion of the packet sequence number; wherein the first portion includes thirty two higher bits of the packet sequence number; and wherein the second portion includes sixteen lower bits of the packet sequence number.

11. The one or more non-transitory computer-readable storage media of claim 8, storing additional instructions for:
in response to determining that the edge service gateway is not configured to prevent IPID overflow, creating a plurality of packet fragments based on, at least in part, the first packet; wherein a packet fragment, of the plurality of packet fragments, comprises an IP header, an additional header and a portion of the first packet; and wherein an IPID field in the IP header stores a packet sequence number for the first packet.

12. The one or more non-transitory computer-readable storage media of claim 8, wherein, for a first packet fragment, of the plurality of packet fragments, a cumulative length of the IP header, the additional header and the portion of the first packet does not exceed a particular fragment length; and wherein an offset field in the IP header of the first packet fragment stores zero.

13. The one or more non-transitory computer-readable storage media of claim 8, storing additional instructions for:
receiving, by the edge service gateway, a packet fragment that requires reassembling; determining whether the edge service gateway is configured to prevent IPID overflow;
in response to determining that the edge service gateway is configured to prevent IPID overflow:
determining a packet sequence number based on contents of a additional key field in a additional header of the packet fragment and contents of an IPID field in an IP header of the packet fragment; and
based on, at least in part, the packet sequence number and the packet fragment, reassembling an original packet that is associated with the packet sequence number.

14. The one or more non-transitory computer-readable storage media of claim 13, storing additional instructions for: in response to determining that the edge service gateway is not configured to prevent IPID overflow: determining a packet sequence number based on contents of an IPID field in a IP header of the packet fragment; and based on, at least in part, the packet sequence number and the packet fragment, reassembling an original packet that is associated with the packet sequence number.

15. An edge service gateway implemented in a computer network and configured to implement mechanisms for preventing Internet Protocol identifier overflow in the computer network, the edge service gateway comprising:
one or more processors;
one or more memory units; and
one or more non-transitory computer-readable storage media storing one or more computer instructions which, when executed by the one or more processors, cause the one or more processors to perform:
receiving, by an edge service gateway, a first packet that requires fragmentating;
determining whether the edge service gateway is configured to prevent Internet Protocol Identifier ("IPID") overflow;
in response to determining that the edge service gateway is configured to prevent IPID overflow:
creating a plurality of packet fragments based on, at least in part, the first packet;
wherein a packet fragment, of the plurality of packet fragments, comprises an IP header, an additional header and a portion of the first packet; and
wherein an additional key field in the additional header and an IPID field in the IP header of the fragment packet store a packet sequence number for the first packet.

16. The edge service gateway of claim 15, wherein determining whether the edge service gateway is configured to prevent IPID overflow comprises:

determining whether a particular flag in a configuration file maintained by the edge service gateway is set;

in response to determining that the particular flag in the configuration file is set, determining that the edge service gateway is configured to prevent IPID overflow; and in response to determining that the particular flag in the configuration file is not set, determining that the edge service gateway is not configured to prevent IPID overflow.

17. The edge service gateway of claim 15, wherein, for a particular packet fragment, of the plurality of packet fragments, the additional key field in the additional header stores a first portion of the packet sequence number and the IPID field in the IP header stores a second portion of the packet sequence number; wherein the first portion includes thirty two higher bits of the packet sequence number; and wherein the second portion includes sixteen lower bits of the packet sequence number.

18. The edge service gateway of claim 15, storing additional instructions for: in response to determining that the edge service gateway is not configured to prevent IPID overflow, creating a plurality of packet fragments based on, at least in part, the first packet; wherein a packet fragment, of the plurality of packet fragments, comprises an IP header, an additional header and a portion of the first packet; and wherein an IPID field in the IP header stores a packet sequence number for the first packet.

19. The edge service gateway of claim 15, wherein, for a first packet fragment, of the plurality of packet fragments, a cumulative length of the IP header, the additional header and the portion of the first packet does not exceed a particular fragment length; and wherein an offset field in the IP header of the first packet fragment stores zero.

20. The edge service gateway of claim 15, storing additional instructions for: receiving, by the edge service gateway, a packet fragment that requires reassembling; determining whether the edge service gateway is configured to prevent IPID overflow;

in response to determining that the edge service gateway is configured to prevent IPID overflow:

determining a packet sequence number based on contents of an additional key field in an additional header of the packet fragment and contents of an IPID field in an IP header of the packet fragment; and based on, at least in part, the packet sequence number and the packet fragment, reassembling an original packet that is associated with the packet sequence number.

* * * * *